US012777319B2

(12) United States Patent
Lee et al.

(10) Patent No.: US 12,777,319 B2
(45) Date of Patent: Oct. 27, 2026

(54) METHOD AND DEVICE FOR MANAGING URSP OF VPLMN IN WIRELESS COMMUNICATION SYSTEM SUPPORTING ROAMING

(71) Applicant: Samsung Electronics Co., Ltd., Suwon-si (KR)

(72) Inventors: Jicheol Lee, Suwon-si (KR); Dongyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 18/309,517

(22) Filed: Apr. 28, 2023

(65) Prior Publication Data

US 2023/0362623 A1 Nov. 9, 2023

(30) Foreign Application Priority Data

May 4, 2022 (KR) ........................ 10-2022-0055755

(51) Int. Cl.
*H04W 8/20* (2009.01)
*H04W 48/18* (2009.01)
*H04W 84/04* (2009.01)

(52) U.S. Cl.
CPC ............ *H04W 8/20* (2013.01); *H04W 48/18* (2013.01); *H04W 84/042* (2013.01)

(58) Field of Classification Search
CPC ........... H04W 8/04; H04W 8/06; H04W 8/16; H04W 8/18; H04W 8/20; H04W 48/18; H04W 84/042
See application file for complete search history.

(56) References Cited

U.S. PATENT DOCUMENTS

| | | | | |
|---|---|---|---|---|
| 2020/0304983 | A1* | 9/2020 | Zhu | H04W 8/082 |
| 2021/0120596 | A1 | 4/2021 | Youn et al. | |
| 2022/0104118 | A1 | 3/2022 | Ding | |
| 2022/0386100 | A1 | 12/2022 | Lee et al. | |

(Continued)

FOREIGN PATENT DOCUMENTS

| | | | |
|---|---|---|---|
| KR | 10-2021-0030771 | A | 3/2021 |
| WO | 2019190166 | A1 | 10/2019 |
| WO | 2020252281 | A1 | 12/2020 |

OTHER PUBLICATIONS

International Search Report and Written Opinion of the International Searching Authority dated Aug. 4, 2023, in connection with International Application No. PCT/KR2023/005822, 6 pages.

(Continued)

*Primary Examiner* — Wayne H Cai

(57) ABSTRACT

The disclosure relates to a 5G or 6G communication system for supporting a higher data transmission rate. According to an embodiment of the disclosure, a method performed by an AMF of a VPLMN in a wireless communication system supporting roaming comprises receiving, by the AMF, subscription information of a user equipment (UE) from a user data management (UDM) in a home public land mobile network (HPLMN) of the UE, and transmitting, to a first policy control function (PCF) of the VPLMN, first information associated with generation of a VPLMN UE route selection policy (URSP) based on the subscription information.

18 Claims, 10 Drawing Sheets

(56) References Cited

U.S. PATENT DOCUMENTS

2023/0388268 A1* 11/2023 Lu ....................... H04L 61/5007
2025/0168108 A1* 5/2025 Karampatsis ......... H04L 45/306

OTHER PUBLICATIONS

Ericsson et al., "UE required to not accept URSP signalled by non-subscribed SNPNs", C1-223157, 3GPP TSG-CT WG1 Meeting #135-e, E-Meeting, Apr. 6-12, 2022, 10 pages.
Samsung et al., "HPLMN control in roaming area", C1-221447, 3GPP TSG-CT WG1 Meeting #134-e, E-meeting, Feb. 17-25, 2022, 11 pages.

* cited by examiner

METHOD AND DEVICE FOR MANAGING URSP OF VPLMN IN WIRELESS COMMUNICATION SYSTEM SUPPORTING ROAMING

CROSS-REFERENCE TO RELATED APPLICATION

This application is based on and claims priority under 35 U.S.C. § 119 to Korean Patent Application No. 10-2022-0055755, which was filed in the Korean Intellectual Property Office on May 4, 2022, the entire disclosure of which is incorporated herein by reference.

BACKGROUND

1. Field

The disclosure relates to a wireless communication system, and more specifically, to a method and device for managing and transferring policy information related to a user equipment (UE) in a wireless communication system.

2. Description of Related Art

5$^{th}$ generation (5G) mobile communication technology defines a wide frequency band to enable fast transmission speed and new services and may be implemented in frequencies below 6 GHz ("sub 6 GHz"), such as 3.5 GHZ, as well as in ultra-high frequency bands ("above 6 GHz"), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIOT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

SUMMARY

In the 3GPP Rel-15/Rel-16 system, the URSP may be transferred to the UE through the H-PCF of the home network (HPLMN). In the case of roaming, the visited network (VPLMN) having a roaming agreement with the home network may also provide valid URSP rules. However, there are cases in which different URSP rules are required for the same application in the VPLMN. Moreover, in the service level agreement (SLA) method, when service rules are dynamically changed, e.g., local area data network (LADN) or edge computing-related URSP rule changes (e.g., DNN, SSC mode, S-NSSAI) may occur in the visited network. In such a case, a method for dynamically changing the URSP rules of the VPLMN through the V-PCF of the VPLMN is required.

The disclosure provides a method and device for efficiently managing the URSP of the VPLMN in a wireless communication system supporting roaming.

The disclosure also provides a method and device that generates a VPLMN URSP by using the subscriber information of the HPLMN to prevent a parameter value not allowed in the subscriber information in the HPLMN from being generated as the URSP when generating the VPLMN URSP in the VPLMN or HPLMN.

The disclosure provides a method and device for managing URSP considering that conflicting URSP rules are generated for the same application in the VPLMN and the HPLMN.

According to an embodiment of the disclosure, a method performed by an access and mobility management function (AMF) of a visited public land mobile network (VPLMN) in a wireless communication system supporting roaming comprises receiving, by the AMF, subscription information of a user equipment (UE) from a user data management (UDM) in a home public land mobile network (HPLMN) of the UE, and transmitting, to a first policy control function (PCF) of the VPLMN, first information associated with generation of a VPLMN UE route selection policy (URSP) based on the subscription information.

According to an embodiment of the disclosure, an AMF of a VPLMN in a wireless communication system supporting roaming comprises a transceiver and a processor configured to receive, by the AMF, subscription information of a UE from a UDM in a HPLMN of the UE, through the transceiver, and transmit, to a first PCF of the VPLMN, first information associated with generation of a VPLMN URSP based on the subscription information, through the transceiver.

According to an embodiment of the disclosure, a method performed by a first PCF of a VPLMN in a wireless communication system supporting roaming comprises receiving first information associated with generation of a VPLMN URSP from an AMF receiving subscription information of a UE from a user data management (UDM), and transmitting, to a second PCF of a HPLMN, the second information for generating the VPLMN URSP based on the first information.

According to an embodiment of the disclosure, a first PCF of a VPLMN in a wireless communication system supporting roaming comprises a transceiver and a processor configured to receive, through the transceiver, first information associated with generation of a VPLMN URSP from an AMF receiving subscription information of a UE from a UDM, and transmit, to a second PCF of a HPLMN through the transceiver, the second information for generating the VPLMN URSP based on the first information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
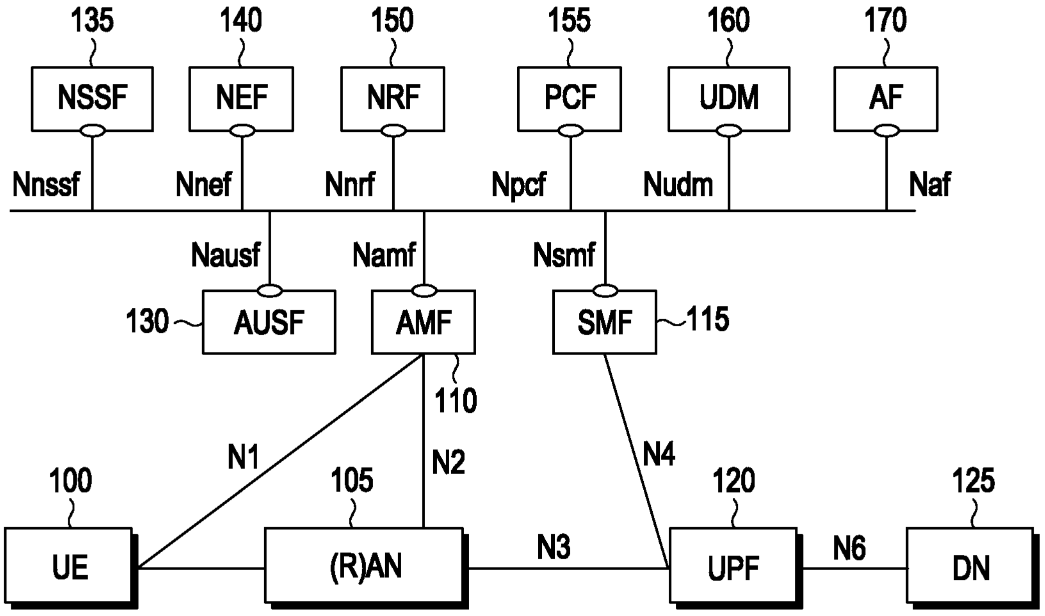
FIG. 1 illustrates a network structure for a 5G system according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a "unit" is not limited to software or hardware. A "unit" may be configured in a storage medium that may be addressed or may be configured to execute one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the "units" may be combined into smaller numbers of components and "units" or further separated into additional components and "units." Further, the components and "units" may be implemented to execute one or more CPUs in a device or secure multimedia card. According to embodiments, a " . . . unit" may include one or more processors.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the terms and names defined in the 3rd generation partnership project 5G and NR standards among the current communication standards are used herein. However, the disclosure is not limited by such terms and names and may be likewise applicable to wireless communication systems conforming to other standards. In particular, the disclosure may be applied to 3GPP GS/NR (5th generation mobile communication standards).

Hereinafter, the base station may be an entity allocating resource to terminal and may be at least one of eNodeB, Node B, base station (BS), radio access network (RAN), access network (AN), RAN node, wireless access unit, base station controller, or node over network. The user equipment (UE) may include a terminal, mobile station (MS), cellular phone, smartphone, computer, or a multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Further, although LTE or LTE-A system is described in connection with embodiments of the disclosure, as an example, embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

Meanwhile, the 3rd generation partnership project (3GPP), which is in charge of cellular mobile communication standardization, has named the new core network structure 5G core (5GC) and standardized the same to promote the evolution from the legacy 4G LTE system to the 5G system. 5GC supports the following differentiated functions as compared to the evolved packet core (EPC), which is the legacy network core for 4G.

First, 5GC adopts the network slicing function. As a requirement of the 5G system, 5GC may support various types of terminals and services, e.g., enhanced mobile broadband (eMBB), ultra reliable low latency communications (URLLC), or massive machine type communications (mMTC). These UEs/services have different requirements for the core network. For example, the eMBB service requires a high data rate while the URLLC service requires high stability and low latency. Network slicing is technology provided to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE.

The 5G system may support network slicing (or may be referred to as the network slice), and traffic for different network slices may be handled by different PDU sessions. The PDU session may mean an association between a data network providing a PDU connection service and a UE. The network slice may be understood as technology for logically configuring a network with a set of network functions (NF) to support various services with different characteristics, such as broadband communication services, massive IoT, V2X, or other mission critical services, and separating different network slices. Therefore, even when a communication failure occurs in one network slice, communication in other network slices is not affected, so that it is possible to provide a stable communication service. The UE may access a plurality of network slices when receiving various services. The network operator may constitute the network slice and may allocate network resources suitable for a specific service for each network slice or for each set of network slices. A network resource may mean an network function (NF) or logical resource provided by the NF or radio resource allocation of a base station.

The network operator may configure a virtual end-to-end network called a network slice and provide service to meet specified requirements for the service/application. For example, the network operator may configure network slice A for providing a mobile broadband service, network slice B for providing a vehicle communication service, and network slice C for providing a broadcast service. In other words, the 5G system may efficiently provide a corresponding service to a UE through a specialized network slice suited for the characteristics of each service. The network slice is identified by an identifier called single-network slice selection assistance information (S-NSSAI). The network transmits a set of allowed slices (e.g., allowed NSSAI(s)) to the UE in a UE registration procedure, and the UE may transmit/receive application data through the PDU session generated through one S-NSSAI (i.e., network slice) among the allowed NSSAI(s).

5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in the 5G system, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

In the disclosure, the network technology may refer to the standards (e.g., TS 23.501, TS 23.502, TS 23.503, etc.) defined by the international telecommunication union (ITU) or 3GPP, and each of the components included in the network architecture of FIG. 1 may mean a physical entity or may mean software that performs an individual function or hardware combined with software. In the drawings, reference numerals shown as N1, N2, N3, . . . , Nxxx indicate known interfaces between the NFs in the 5G core network (CN).

FIG. 1 illustrates a network structure for a 5G system according to an embodiment of the present disclosure.

The 5G system of FIG. 1 may include a 5G core network (5GC), a base station 105 and a UE 100. The 5GC may include an access and mobility management function (AMF) 110 for managing mobility of the UE 100, a session management function (SMF) 115 for managing the session, a user plane function (UPF) 120 connected to a data network (DN) 125 to perform a data transfer function, a network slice selection function (NSSF) for selecting a network slice serving the UE 100, an authentication server function (AUSF) 130 for authenticating network entity(s) in the 5G system, a network exposure function (NEF) 140 for transmitting or receiving the event occurring in the 5G system and the supporting capability to the outside, a network repository function (NRF) 150 for managing registration information about the NFs, a policy control function (PCF) 155 for providing a policy control function of the network operator, and a user data management (UDM) 160 for providing a data management function such as of subscriber data and policy control data, and the application function (AF) 170 that provides an application service may communicate with the 5GC.

The AMF 110 is an entity for managing access and mobility of the UE 100. As an example, the AMF 110 may perform such functions as registration of the UE 100, connection, reachability, mobility management, access identification/authentication, and mobility event generation. The SMF 115 may perform a management function for a protocol data unit (PDU) session of the UE 101. For example, the SMF 135 may perform such network functions as session management functions of establishing, modifying, or releasing a session and maintaining a tunnel between the UPF 120 and the base station 105, the functions of allocating and managing an Internet protocol (IP) address of the UE 100, selection and control of the user plane. The UPF 120 may perform a data processing function of transferring data transmitted by the UE 100 to the DN 125, which is an external network, or transferring data received from the DN 125 to the UE 100.

Further, the UPF 120 may perform network functions, such as acting as an anchor between radio access technologies (RATs), providing connection with PDU sessions and the AF 170, packet routing and forwarding, packet inspection, application of user plane policy, creating a traffic usage report, or buffering. The PCF 155 may manage operator policy information for providing the service in the 5G system, and the UDM 160 may perform functions such as generating authentication information for 3GPP security, managing the list of network functions NF supporting the UE 100, and managing subscription information. Further, the 5G system supports a technology called session and service continuity (SSC) mode that supports session continuity for the purpose of improving quality-of-experience (QoE) of users or supporting mission critical services.

As illustrated in FIG. 1, when the UE 100 registers with a network, the UE 100 may transmit identification information (i.e., requested S-NSSAIs) about network slices to be requested to the AMF 110, and the AMF 110 may provide the UE 100 with information (allowed NSSAI) about network slices usable by the UE 100 in consideration of the requested S-NSSAIs and subscriber information. Meanwhile, in order to transmit and receive data to and from a specific data network (DN) through allowed slices (allowed NSSAIs), the UE 100 may select one of the allowed slices, request the data network name (DNN) for the network slice to generate a PDU session, and transmit and receive data through the generated PDU session.

Hereinafter, a UE policy (ANDSP & URSP) control function is described in embodiments of the disclosure.

The UE policy may include an access network discovery & selection policy (ANDSP) and a UE route selection policy (URSP). The access network discovery and selection policy ANDSP is the policy for the UE to select the non-3GPP access network (i.e., the Wi-Fi network). The URSP is used to determine whether to associate application traffic detected by a UE with a previously generated PDU session, to offload the application traffic to a non-3GPP access network outside the PDU session, or to request generation of a new PDU session. The URSP may include a service and session continuity (SSC) mode selection policy, a network slice selection policy, a data network name (DNN) selection policy, a non-seamless offloading policy, and an access type preference (preference for 3GPP or non-3GPP).

The UE policy (the access network discovery and selection policy ANDSP and/or the URSP) may be pre-configured in the UE or may be configured by the PCF.

When the initial registration procedure of the UE 100 is performed, the PCF 155 may distribute the UE policy when the location of the UE 100 is changed, when the AMF 110 for managing mobility of the UE 100 is changed, or at the time determined by the network operator. The UE policy may be divided into policy sections by the PCF 155 and transmitted to the UE 100.

The access network discovery and selection policy ANDSP is described in detail. The UE 100 may register with the 5GC through a non-3GPP interworking function (N3IWK) (not shown) to use a wireless local area network (WLAN) access network.

When the WLAN access network may not be selected for user preference, the UE 100 may determine the most preferred WLAN access network by using the WLAN selection policy.

The access network discovery and selection policy ANDSP may include one or more WLAN selection policy (WLANSP) rules, and one WLANSP may include a condition in which the policy is valid and a WLAN selection criterion. The condition in which the WLANSP policy is valid may be the valid time or spatial area information where the WLANSP is valid or network location information such as the business operator and the location area. Also, the WLAN selection criterion may include information such as a preferred roaming partner list, a minimum backhaul threshold value, and the like.

Hereinafter, the URSP is described in embodiments of the disclosure.

The URSP includes UE route selection policy rules having precedence. The UE 100 may receive a URSP from a home network (i.e., the home public land mobile network (HPLMN)).

The URSP may include the following information as shown in Table 1. For example, the URSP may include, e.g., a list of rule precedence, traffic descriptors, and route selection descriptors. The traffic descriptor may include an application identifier and an IP descriptor. The route selection descriptor may include route selection components including an SSC mode selection, a network slice selection, a DNN selection, a non-seamless offloading indicator, and an access type preference indicator, as shown in Table 2.

TABLE 1

| Information Name | Description |
|---|---|
| Rule Precedence | determines the precedence in which the URSP is enforced in the UE |
| Traffic descriptor | defines the traffic descriptor for UE policy |
| Application identifier | Application Program Identifier |
| IP descriptor | indicate IP3 tuple That is, indicates the destination IPv4 address or IPv6 network prefix and the destination port address and the IP higher protocol ID. |
| Non-IP Descriptor | a descriptor for non-IP traffic. |
| List of route selection descriptors | a list of route selection descriptors (including the information described in Table 2). |

TABLE 2

| Information name | Description | Remarks |
|---|---|---|
| route selection descriptor precedence | determines precedence in which route selection descriptor applies | |
| route selection component | The following is included as route selection components | note 1 |
| SSC mode selection | has one or more SSC mode values | |
| network slice selection | has one or more S-NSSAI values | |
| DNN selection | has one or more DNN values | |
| discontinuous offloading indicator | The UE determines whether to apply non-continuous offloading to the detected application program conforming to the rule. | |
| access type preference | indicates a preferred access type (i.e., 3GPP or non-3GPP) when the UE generates a PDU session for traffic of the detected application program conforming to the rule. | |

note 1.
The route selection component may include at least one of the SSC mode selection component, the network slice selection component, the DNN selection component, the discontinuous offloading selection component, and the access type preference selection component.

The PCF 155 transmitting the UE policy may divide the UE policies into policy sections divided into one or more different policy section identifiers (PSIs). PCF 155 may allocate all URSPs to one policy section or one or more URSPs to one policy section. The PCF 155 may compare the PSI list received from the UE 100 with the PSI list to be installed in the UE 100, and may transmit the UE policy to the UE 100 to determine whether to update the PSI list. When determining to update the PSI list, the PCF 155 may transmit the PSI list to be updated and the content for each PSI to the UE 100. The PSI may be encoded as a UE policy section index (UPSI), and the UPSI may include an identifier (e.g., a PLMN ID) of the network operator that transmits the UE policy. That is, the UPSI transmitted from the visited PCF (hereinafter, V-PCF) of the visitor network (visited VPMN, VPLMN) may include the visited PLMN ID, and the UPSI transmitted from the home PCF (hereinafter, H-PCF) of the home network (HPLMN) may include the home PLMN ID and may refer to a network operator that has generated the URSP or ANDSP rule associated with the UPSI.

In the initial registration procedure, the UE 100 transmits the PSI list stored in the UE 100 to the PCF 155 through the network. When there is no UE policy stored in the UE 100, the UE 100 does not transmit the PSI list. The UE 100 may transmit UE Policy Info to synchronize the UE policy in the initial registration procedure. This procedure may be performed when the UE 100 is powered on, when there is no UE policy information, or when a universal subscriber identity module (USIM) is transferred from one UE to another UE.

The UE 100 may update the UE policy stored in the UE 100 in the following manner based on the UE policy provided from the PCF 155.

When there is no policy for the same PSI with respect to the PSI transmitted from the PCF 155, the UE 100 may store the UE policy rule(s) included in the policy section referred to as the new PSI. When there is a pre-existing (pre-stored) UE policy section for the same PSI, the UE 100 replaces the pre-stored policy section with the policy section received from the PCF 155. Also, when there is an instruction to delete the PSI received from the PCF 155, the UE 100 deletes the policy section for the stored PSI.

The UE 100 receiving the UE policy from the PCF 155 confirms the accuracy of the received policy. For example, the UE 100 identifies whether all of the UE policy section entries for the PSI list to be installed have been received, whether there are components of the missing rules, or whether there are conflicting rules.

Further, the UE 100 may perform operations 1) and 2) for individual policy section entries in the PSI list to be installed.

1) When there is no policy for the corresponding PSI, the UE 100 stores and installs the rule included in the policy section entry.
2) When there is a policy for the corresponding PSI, the UE 100 replaces the rule included in the policy section entry.

When there is a stored policy section entry, the UE 100 deletes the PSI list to be deleted. Alternatively, when the received policy section entry is empty, the UE 100 deletes the rule for the corresponding PSI.

The UE 100 receiving the UE policy from the PCF 155 may transmit a response message to the PCF 155 through the AMF 110. After the UE 100 performs the operation presented by the PCF 155 for the policy section, the UE 100 may transmit the PSI list installed to indicate the installed UE policy to the PCF 155.

According to the requirements of the network operator, the PCF 155 may include a temporal and/or spatial condition in which the UE policy transmitted to the UE 100 is implemented in a UE container and may transmit the condition to the UE 100. The temporal condition for enforcing the UE policy may include at least one of the following cases:

- enforce immediately after installation;
- enforce within 1 hour after installation;
- enforce when rebooting the UE after installation;
- enforce when entering airplane mode after installation;
- enforce when airplane mode is released after installation;
- enforce in roaming mode after installation; and/or
- enforce at absolute time (e.g., noon on May 1, 2018) after installation.

The spatial condition identified as the access network for enforcing the UE policy may include at least one of the following cases:

- enforce when a specific PLMN is visible after installation;
- enforce when a specific air interface (e.g., 5G NR, LTE, eLTE, 3G, 2G, etc.) is detected after installation;
- enforce when voice over LTE (VoLTE) is available after installation;
- enforce when a local area data network (LADN) DNN is discovered after installation;
- enforce when the UE 100 is located in a specific space identified by the global positioning system (GPS) after installation; and/or
- enforce when a specific Wi-Fi service set identifier (SSID) is scanned after installation.

Figure 2:
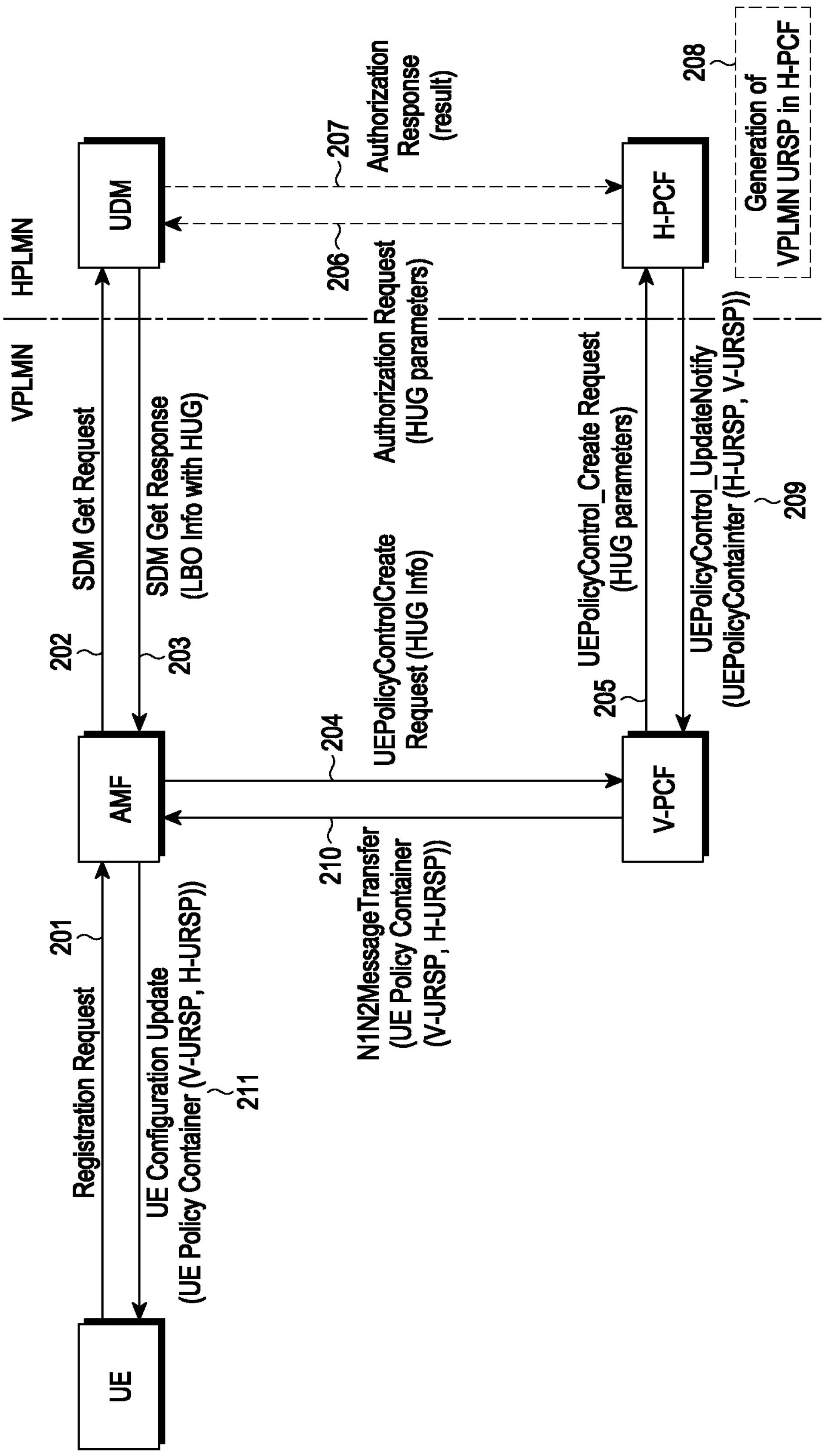
FIG. 2 illustrates a method for generating a URSP of a VPLMN in an H-PCF in a wireless communication system according to an embodiment of the present disclosure.

FIG. 2 illustrates a method for generating a URSP of a VPLMN in an H-PCF in a wireless communication system according to an embodiment of the present disclosure.

In the example of FIG. 2, the basic functions of the AMF, UDM, and PCF (V-PCF, H-PCF) are the same as those of FIG. 1, and thus a detailed description thereof will be omitted. Hereinafter, in embodiments of the disclosure, the V-PCF may be referred to as a PCF of the VPLMN, and the H-PCF may be referred to as a PCF of the HPLMN. FIG. 2 illustrates an embodiment of generating a URSP for a subscriber (i.e., a UE) in an HPLMN. The URSP generated in the HPLMN may include the URSP requested by the VPLMN. The V-PCF of the VPLMN provides the H-PCF with additional information (HUG parameter) for URSP generation in the H-PCF, that is, for home URSP generation (HUG). In order for the V-PCF to determine the HUG parameter, the V-PCF receives local breakout (LBO) information stored in the UDM from the AMF. Information for generating the HUG parameter may be included in the LBO information.

Specifically, operations 201 to 203 of FIG. 2 are procedures in which the UE performs registration in the serving network in the roaming situation from the HPLMN to the VPLMN. In operation 201, the UE transmits a registration request to the AMF of the VPLMN to perform the registration procedure. In operation 202, the AMF transmits a subscriber data management (SDM) get request to the UDM of the HPLMN of the UE to request subscriber information for the UE and, in response thereto, receives the UE's subscriber information from the UDM in operation 203. The subscriber information received by the AMF may include LBO information including DNN and S-NSSAI available in the VPLMN. The UDM may provide the AMF with an indicator (HUG) allowing generation of the VPLMN URSP in the HPLMN according to an embodiment of the disclosure along with the LBO information.

Further, the indicator HUG for allowing/instructing generation of the VPLMN URSP in the HPLMN may be included in the LBO information and provided. In operation 204, the AMF of the VPLMN transmits a UE policy control generation (UEPolicyControl_Create) request to the V-PCF of the VPLMN. In this case, the AMF may transmit information (HUG info) for generating the VPLMN URSP in the HPLMN to the V-PCF based on the indicator (HUG) allowing/instructing generation of the VPLMN URSP in the HPLMN. The information (HUG info) for generating the VPLMN URSP in the HPLMN may include components for determining a route selection component of the URSP rule as subscriber information for the VPLMN URSP.

In operation 205, the V-PCF transmits, to the H-PCF, a request for generating the HPLMN USRP and a UE policy control generation (UEPolicyControl_Create) request including parameters (HUG parameters) including at least one of components for determining a route selection component of the URSP rule. The parameters may use the same information as information (HUG info) for generating the VPLMN URSP or may use information reconfigured based on the HUG info. Upon receiving the UE policy control generation (UEPolicyControl_Create) request in operation 206, the H-PCF transmits an authentication request including the received parameters (HUG parameters) from the UDM to request confirmation of whether the received parameters (HUG parameters) are usable for the corresponding UE, and, in operation 207, receives an authentication response including a result of the confirmation request.

When it is identified that the parameters (HUG parameters) are usable for the corresponding UE, in operation 208, the H-PCF may generate a VPLMN URSP (i.e., a V-URSP) based on the parameters (HUG parameters). The VPLMN URSP (i.e., V-URSP) may allocate a VPLMN precedence range requested by the VPLMN, and may be generated based on the precedence or precedence range or a precedence list to be included in the URSP rule usable in the allocated VPLMN. The H-PCF may generate an HPLMN URSP (i.e., H-URSP) based on the precedence, the precedence range, or the precedence list to be included in the URSP rule usable in the HPLMN. In operation 209, the H-PCF transfers a UE policy control update notification (UEPolicyControl_UpdateNotify) including the H-URSP and the V-URSP to the V-PCF through signaling with the V-PCF and, in operation 210, the V-HCF transmits a transmission message including the H-URSP and the V-URSP to the AMF and, in operation 211, the AMF transmits a UE configuration update including the H-URSP and the V-URSP to the UE.

Specific configurations of the H-URSP and V-URSP are described below. Hereinafter, in embodiments of the disclosure, the URSP of the VPLMN may be referred to as V-URSP or VPLMN URSP, and the URSP of the HPLMN may be referred to as H-URSP or HPLMN URSP.

Figure 3:
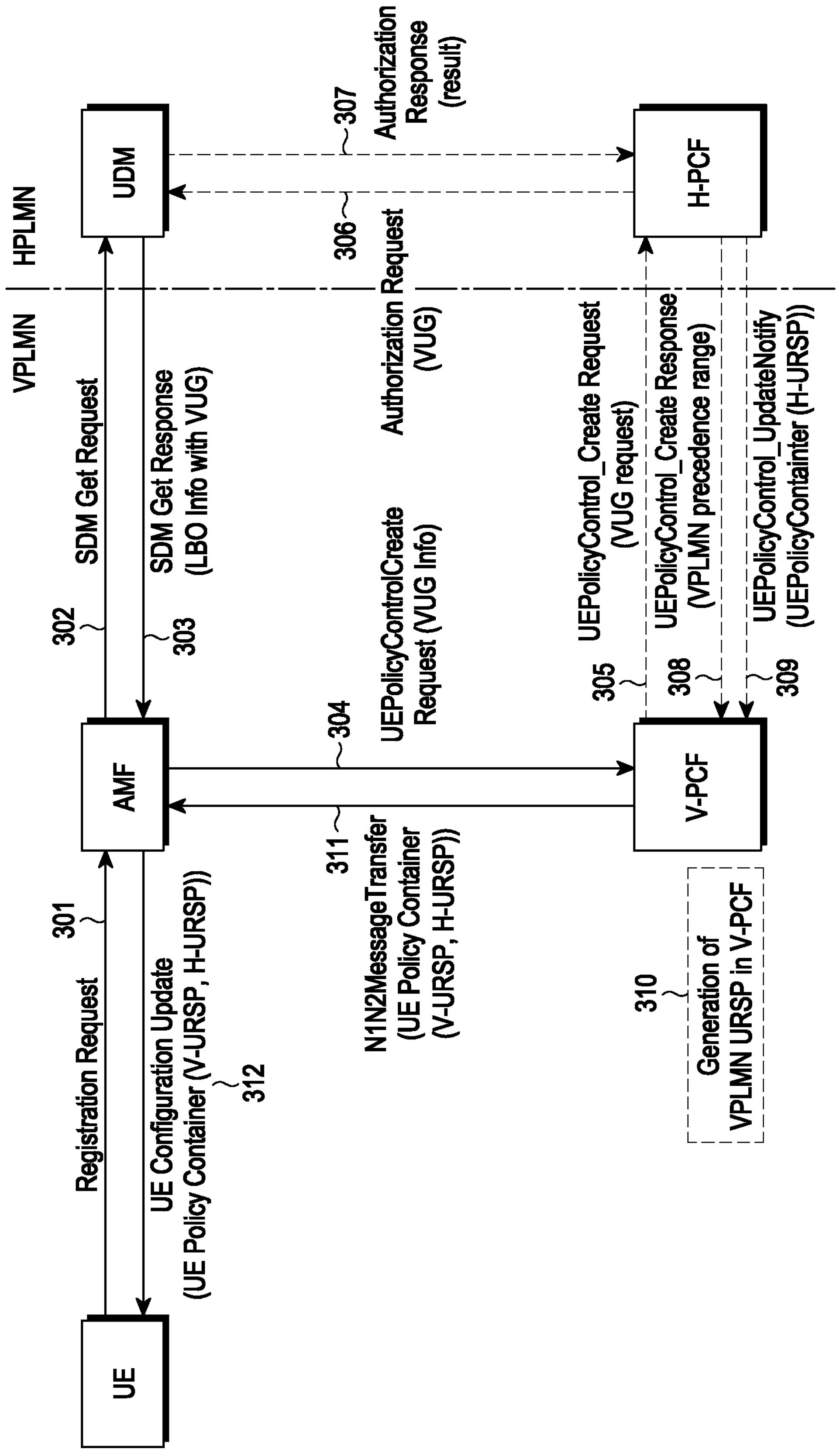
FIG. 3 illustrates a method for generating a VPLMN URSP in a V-PCF in a wireless communication system according to an embodiment of the present disclosure.

FIG. 3 illustrates a method for generating a VPLMN URSP in a V-PCF in a wireless communication system according to an embodiment of the present disclosure.

In the example of FIG. 3, the basic functions of the AMF, UDM, and PCF (V-PCF, H-PCF) are the same as those of FIG. 1, and thus a detailed description thereof will be omitted. FIG. 3 illustrates an embodiment in which a VPLMN generates a VPLMN URSP for a subscriber (UE) in a VPLMN, and the VPLMN directly transmits the VPLMN URSP to the UE. In order for the V-PCF of the VPLMN to generate the VPLMN URSP, the V-PCF receives the LBO information stored in the UDM from the AMF. Information for generating the HUG parameter may be included in the LBO information.

Specifically, operations 301 to 303 of FIG. 3 are procedures in which the UE performs registration in the serving network in the roaming situation from the HPLMN to the VPLMN. In operation 301, the UE transmits a registration request to the AMF of the VPLMN to perform the registration procedure. In operation 302, the AMF transmits an SDM get request to the UDM of the HPLMN of the UE to request subscriber information for the UE and, in response thereto, receives the UE's subscriber information from the UDM in operation 303. The subscriber information received by the AMF may include LBO information including DNN and S-NSSAI available in the VPLMN. The UDM may provide the AMF with an indicator (VUG) allowing/instructing generation of the VPLMN in the URSP according to an embodiment of the disclosure along with the LBO information.

Further, the indicator VUG for allowing/instructing generation of the VPLMN URSP in the VPLMN may be included in the LBO information and provided. In operation 304, the AMF of the VPLMN transmits a UE policy control generation (UEPolicyControl_Create) request to the V-PCF of the VPLMN. In this case, the AMF may transmit information (VUG info) for generating the VPLMN URSP in the VPLMN to the V-PCF based on the indicator (VUG) allowing/instructing generation of the VPLMN URSP in the VPLMN. The information (VUG info) for generating the VPLMN URSP in the VPLMN may include elements for determining a route selection component of the URSP rule as subscriber information for the VPLMN URSP.

In operation 305, the V-PCF transfers, to the H-PCF, a UE policy control generation (UEPolicyControl_Create) request including a VUG request indicating that the V-PCF directly generates the VPLMN URSP. The V-PCF may include, in the UE policy control generation (UEPolicyControl_Create) request, a request for identifying whether route selection components included in the VPLMN URSP directly generated by the V-PCF conform to the subscriber policy of the HPLMN. The request may include a list of route selection components included in the VPLMN URSP rule to be generated by the V-PCF. Upon receiving the UE policy control generation (UEPolicyControl_Create) request in operation 306, the H-PCF transmits, from the UDM, an authorization request for identifying whether the VPLMN URSP may be directly generated in the V-PCF to request identification, and receives, in operation 307, an authorization response including a result of the identification request.

When it is identified that the V-PCF may directly generate the VPLMN URSP, in operation 308, the H-PCF allocates the VPLMN precedence, the precedence range, or the precedence list, and transmits a UE policy control generation (UEPolicyControl_Create) response including information according to the allocation to the V-PCF. The H-PCF may generate an HPLMN URSP (i.e., H-URSP) based on the precedence, the precedence range, or the precedence list to be included in the URSP rule usable in the HPLMN. Thereafter, in operation 309, the H-PCF transfers the UE policy control update notification (UEPolicyControl_UpdateNotify) including the H-URSP to the V-HCF through signaling with the V-PCF, in operation 310, the V-HCF generates a VPLMN URSP (i.e., V-URSP) based on the precedence or precedence range or precedence list to be included in the URSP rule usable in the VPLMN and, in operation 311, transmits a transmission message including the H-URSP and the V-URSP to the AMF, and in operation 312, the AMF transmits a UE configuration update including the H-URSP and the V-URSP to the UE.

Figure 4:
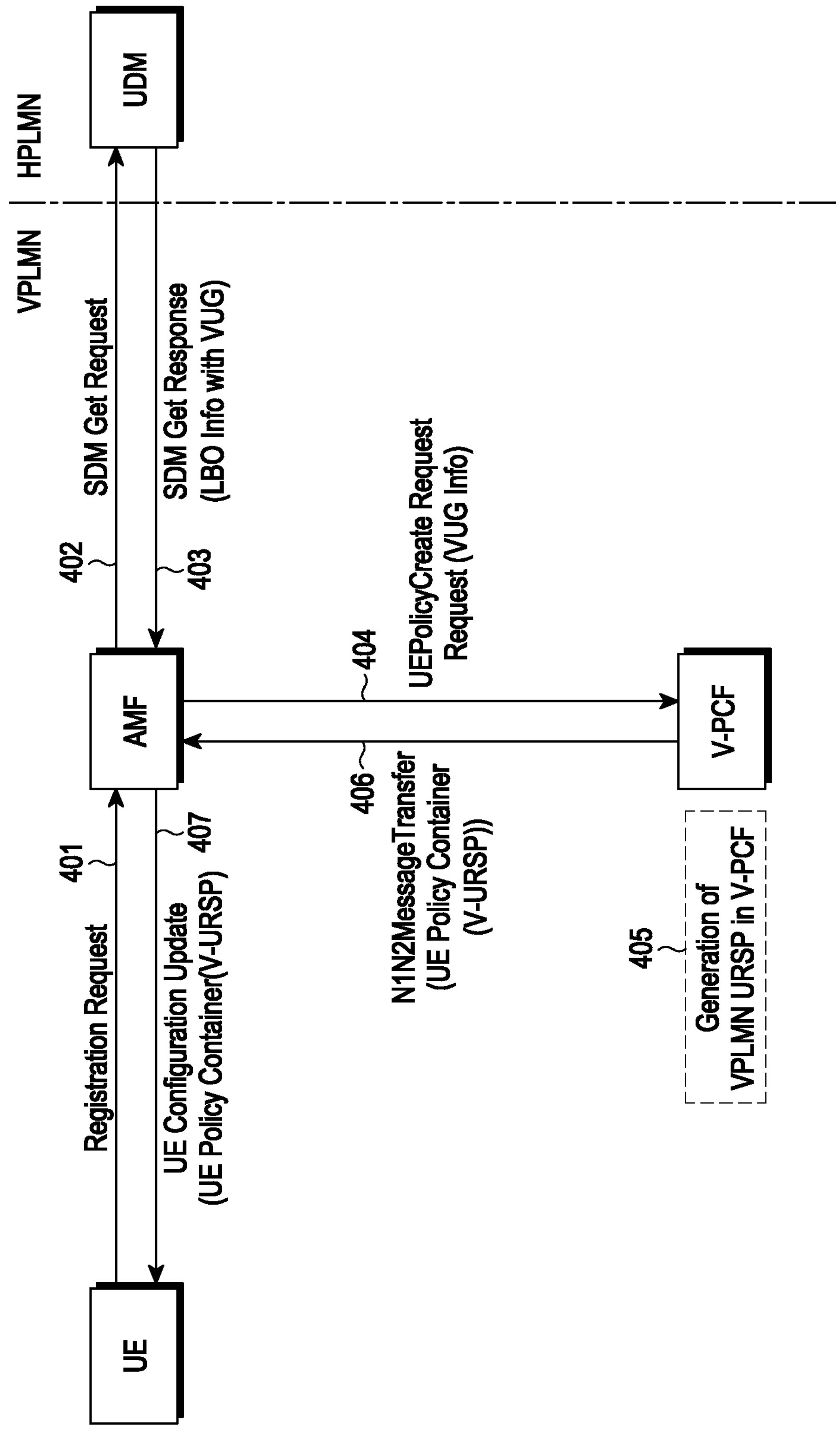
FIG. 4 illustrates a method for generating a VPLMN URSP in a V-PCF in an environment in which a PCF for a UE policy is not installed in the HPLMN in a wireless communication system according to an embodiment of the present disclosure.

FIG. 4 illustrates a method for generating a VPLMN URSP in a V-PCF in an environment in which a PCF for a UE policy is not installed in the HPLMN in a wireless communication system according to an embodiment of the present disclosure.

In the example of FIG. 4, the basic functions of the AMF, UDM, and PCF (V-PCF) are the same as those of FIG. 1, and thus a detailed description thereof will be omitted. FIG. 4 illustrates an example in which a PCF is not installed in an HPLMN, and corresponds to an environment in which a UE policy including a URSP is not dynamically updated, and a case in which a dynamic PCC is not installed. As shown in the example of FIG. 4, V-PCF generates VPLMN URSP.

Specifically, operations 401 to 403 of FIG. 4 are procedures in which the UE performs registration in the serving network in the roaming situation from the HPLMN to the VPLMN. In operation 401, the UE transmits a registration request to the AMF of the VPLMN to perform the registration procedure. In operation 402, the AMF transmits an SDM get request to the UDM of the HPLMN of the UE to request subscriber information for the UE and, in response thereto, receives the UE's subscriber information from the UDM in operation 403. The subscriber information received by the AMF may include LBO information including DNN and S-NSSAI available in the VPLMN. The UDM may provide the AMF with an indicator (VUG) allowing/instructing generation of the VPLMN for the roaming UE in the URSP according to an embodiment of the disclosure along with the LBO information.

Further, the indicator VUG for allowing/instructing generation of the VPLMN URSP in the VPLMN may be included in the LBO information and provided. In operation 404, the AMF of the VPLMN transmits a UE policy generation (UEPolicyCreate) request to the V-PCF of the VPLMN. In this case, the AMF may transmit information (VUG info) for generating the VPLMN URSP in the VPLMN to the V-PCF based on the indicator (VUG) allowing/instructing generation of the VPLMN URSP in the VPLMN. The information (VUG info) for generating the VPLMN URSP in the VPLMN may include elements for determining a route selection component of the URSP rule as subscriber information for the VPLMN URSP. In operation 405, the V-PCF generates a VPLMN URSP (i.e., a V-URSP) based on components for determining a route selection component of the URSP rule and transmits a transmission message including the V-URSP to the AMF in operation 406. In operation 407, the AMF transmits a UE configuration update including the V-URSP to the UE.

Figure 5:
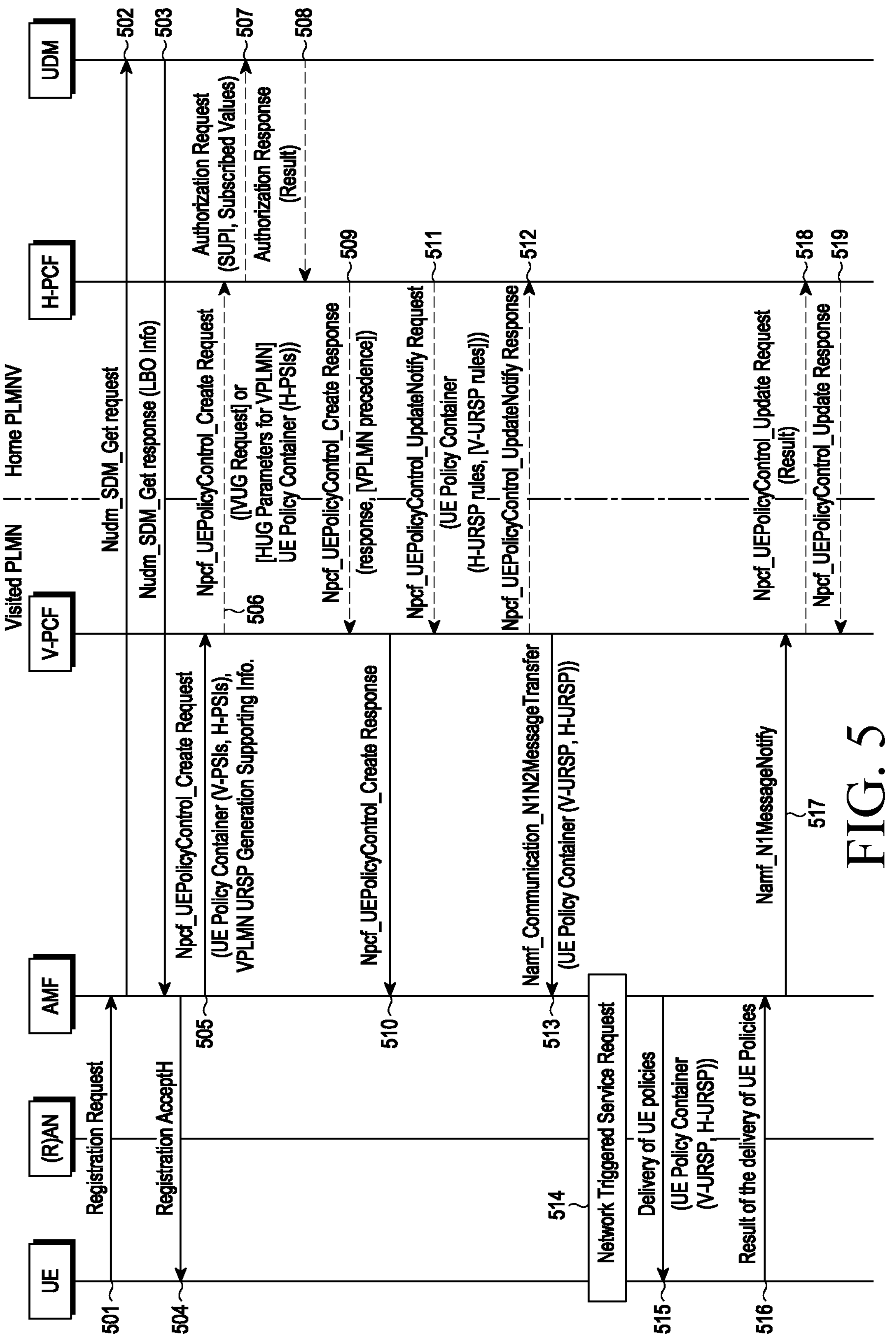
FIG. 5 illustrates a procedure for generating and transferring a VPLMN URSP in a wireless communication system according to an embodiment of the present disclosure.

FIG. 5 illustrates a procedure for generating and transferring a VPLMN URSP in a wireless communication system according to an embodiment of the present disclosure.

In the example of FIG. 5, the basic functions of each network entity are the same as those in the description of FIG. 1, and thus a detailed description thereof will be omitted. The procedure of FIG. 5 is an integrated procedure of all the procedures performed for three scenarios in the above-described embodiments of FIGS. 2, 3, and 4. When different operations are required for each scenario of FIGS. 2, 3, and 4, the corresponding scenarios are distinguished as CASE A, CASE B, and CASE C.

Specifically, operations 501 to 504 of FIG. 5 are procedures in which a UE performs a registration procedure in a serving network in a roaming situation.

In operation 501, the UE transmits a registration request message to the AMF of the VPLMN to perform the registration procedure. In operation 501, the UE includes a list of policy section identifiers (PSIs) installed in the UE in the UE policy container, and transmits a registration request message including the UE policy container to the AMF. The policy section identifier PSI may include at least one of the PSI (V-PSI) of the VPLMN and the PSI (H-PSI) of the HPLMN. The information for distinguishing the PLMN may be identified through the PSI information included in the UE policy container, and the information for identifying the PLMN may distinguish whether the PSI is the PSI allocated and transmitted by the VPLMN or the PSI allocated and transmitted by the HPLMN. The PSI transmitted from the VPLMN is expressed as the V-PSI, and the PSI transmitted from the HPLMN is expressed as the H-PSI.

In operation 502, the AMF identifies the home network of the UE through a subscription concealed identifier (SUCI) and identifies the HPLMN. The AMF transmits an SDM get request to the UDM of the HPLMN to request subscriber information for the UE.

In operation 503, the AMF of the VPLMN receives subscriber information from the UDM of the HPLMN. The subscriber information received by the AMF may include LBO information in the information (hereinafter, SMF selection information) for the AMF to select the SMF. The LBO information may include DNN and S-NSSAI information available in the VPLMN. In other words, the LBO information received by the AMF may be included in the SMF selection information used by the AMF of the VPLMN to select an SMF. Accordingly, the LBO information may be referred to as the SMF selection information.

As described above, the UE may request the DNN for the allowed network slice to generate a PDU session and transmit/receive data through the generated PDU session. The network slice may be identified by the S-NSSAI. Accordingly, the DNN and S-NSSAI information included in the LBO information (or information denoted as LBO information) in the subscription information received by the AMF from the UDM of the HPLMN may be understood as the UE's session-related subscription information. The subscription information received from the HPLMN may be simply referred to as HPLMN subscription information, and the HPLMN subscription information may be understood as information corresponding to the SMF selection information.

In operation 503, the UDM of the HPLMN may transmit information for generating the URSP to the AMF of the VPLMN. The information for generating the URSP (i.e., VPLMN URSP support information) may include at least one of information such as the following 1 to 5.

1) Indicator allowing VPLMN URSP to be generated and/or transmitted in VPLMN (VPLMN URSP Generation allowed indication, VUG).
2) Indicator indicating generation of URSP rule requested by VPLMN in HPLMN at the request of VPLMN (HPLMN URSP Generation, HUG). This may be the HUG may be an indicator for allowing only the HPLMN in VPLMN URSP generation at the request of the VPLMN, an indicator for expressing content indicating that direct generation of the URSP is not allowed in the VPLMN, or an indicator for indicating the capability of generating the URSP at the request of the VPLMN in the HPLMN.
3) Indicator indicating whether PCF is installed in HPLMN.
4) Subscriber information for the VPLMN URSP: The UDM of the HPLMN may directly generate the VPLMN URSP in the VPLMN or may include subscriber information necessary to request the HPLMN to generate the VPLMN URSP in the subscription information and transfer the information. The subscriber information for the VPLMN URSP may include at least one of components for determining the route selection component of the URSP rule, and the components for determining the route selection component may include, e.g., the DNN, the S-NSSAI, the SSC mode, the PDU session type, the non-seamless offload indicator, the prose layer 3 UE-to-network offload Indication, and the like.
5) The subscriber information for the VPLMN URSP may include route selection validation criteria of the URSP rule. The route selection verification criteria may include time information or area information in which a corresponding route selection component is valid. The area information may include at least one of information such as a PLMN ID, a tracking area, and a cell identifier.

In operation 504, the AMF transmits a message for granting the registration request of the UE to the UE.

In operation 505, the AMF of the VPLMN transmits a UE policy control generation (UEPolicyControl_Create) request to the V-PCF of the VPLMN. The AMF may transmit, to the V-PCF, the UE policy container received from the UE through the UE policy control generation (UEPolicyControl_Create) request and information set by the AMF itself or information for generating the VPLMN URSP (VPLMN URSP generation support information) received from the UDM in operation 503. The UE policy container may include the V-PSI and the V-PSI.

Upon receiving the UE policy control generation request from the AMF in operation 506, the V-PCF may determine whether to generate the VPLMN URSP by itself and transfer the VPLMN URSP to the UE or to request the H-PCF to generate the VPLMN URSP by identifying the content (e.g., HUG or VUG) included in the VPLMN URSP support information received from the AMF. Alternatively, in another embodiment, the V-PCF may determine whether to directly generate the VPLMN URSP or to request the H-PCF to generate the VPLMN URSP through its own configuration in the V-PCF or PCF control policy information stored in the V-UDR. When PCF control policy information is configured in the V-UDR, the V-PCF may perform a procedure (not shown) of obtaining PCF control policy information from the V-UDR before performing operation 506.

In operation 506, the V-PCF transfers a UE policy control generation request to the H-PCF. The V-PCF transfers the PSI list received from the UE to the H-PCF. As described above, the V-PCF may receive information for generating the VPLMN URSP from the AMF, and may determine one of the following two scenarios according to the V-PCF's own configuration and PCF control policy information.

CASE A) Scenario in which V-PCF requests HPLMN to generate URSP rule for VPLMN (e.g., embodiment of FIG. 2).

CASE B) When the V-PCF generates the VPLMN URSP by itself and transmits the HPLMN URSP received from the H-PCF and the VPLMN URSP generated by the V-PCF to the UE (e.g., the embodiment of FIG. 3).

CASE C) When the H-PCF is not installed in the HPLMN, the V-PCF transmits the VPLMN URSP to the UE (e.g., the embodiment of FIG. 4).

When the case corresponds to case A, the V-PCF may transmit a request for generating the VPLMN and/or HPLMN USRPs and parameters for the request to the H-PCF. The V-PCF may transfer a VPLMN and/or HPLMN URSP generation (HUG, HPLMN URSP generation) request to the H-PCF. The HUG request may include an explicit indicator, or may indicate a HUG request by transmitting a parameter for the HUG generation request. The parameter for generating the HUG may be at least one of a traffic descriptor for identifying an application managed by the VPLMN V-PCF and a route selection descriptor including route selection components. Further, when the VPLMN requests generation of a plurality of URSP rules, the VPLMN may include relative precedence information for the requested URSP rules. Further, the V-PCF may include and transmit route selection validation criteria of the URSP including time and/or location information at which the URSP rule is applied to the HUG request.

When the case corresponds to case B, the V-PCF may transfer, to the H-PCF, request information (VUG, VPLMN URSP generation request) indicating that the V-PCF itself generates the VPLMN URSP. The VUG request may include an explicit indicator, or may indirectly indicate the VUG request by transmitting request information for the VUG generation request. The V-PCF may include a request for identifying whether the route selection components included in the URSP rule generated by the V-PCF conform to the subscriber policy of the HPLMN. The VUG request may include a list of route selection components included in the VPLMN URSP rule to be generated by the V-PCF. The V-PCF may include, in the VUG request, the values requiring the H-PCF to determine/identify as to whether the values are included in the HPLMN subscription information of the UE identifiable through the UDM and transfer the values to the H-PCF. When the V-PCF needs to generate a plurality of VPLMN URSPs, the V-PCF may transmit a precedence request for the required VPLMN URSP to the H-PCF. The request may include information about the number of precedence required to generate the VPLMN URSP in the V-PCF requiring allocation.

When the case corresponds to case C, the V-PCF may determine to generate the VPLMN URSP by itself. In this case, the V-PCF may not transmit the UE policy generation request to the H-PCF.

In operation 506, the H-PCF receives a UE policy generation request message from the V-PCF.

In CASE A, the H-PCF receives a URSP generation request for the VPLMN from the V-PCF.

The H-PCF receives HUG parameters for generating the VPLMN URSP received from the VPLMN. The parameter may include at least one of information for identifying the application for generating the traffic descriptor of the URSP, for example, the fully qualified domain name (FQDN), the IP address or the IP address range, the identifier for identifying the UE application, and the route selection component list for generating the route selection descriptor of the URSP. When there is a plurality of URSP rules to be generated, the H-PCF may also receive a relative URSP precedence list capable of determining the precedence of the URSP rule.

In CASE B, the H-PCF receives a VPLMN URSP generation permission request (VUG request) from the V-PCF. The H-PCF may determine whether to allow the UDM to generate the VPLMN URSP by itself through the UE policy information of the H-PCF. Alternatively, the H-PCF may identify the roaming agreement with the corresponding VPLMN through the policy information included in the UDR of the HPLMN, thereby identifying whether the V-PCF may generate the VPLMN URSP by itself. Alternatively, the H-PCF may request the UDM to determine whether the VPLMN URSP requested by the V-PCF may generate VPLMN URSP on its own. When the H-PCF determines whether the VPLMN URSP may be generated by itself in the V-PCF, the H-PCF may determine a response to the VPLMN URSP generation permission request. When the H-PCF determines permission for generating the VPLMN URSP, the H-PCF may allocate the VPLMN precedence, the precedence range, or the precedence list to the VPLMN precedence range allocation request requested by the V-PCF, and may include the VPLMN precedence, the precedence range, or the precedence list in the response message and transmit the response message to the V-PCF.

In operations 507 and 508, the H-PCF may identify the subscriber information of the H-PCF through the UDM.

In CASE A, the H-PCF may request the UDM as to whether to allow to use and identify whether the route selection components in the route selection descriptor of the URSP are values usable by the corresponding subscriber UE.

In CASE B, the H-PCF may request the UDM to determine whether the VPLMN URSP requested by the V-PCF may generate the VPLMN URSP by itself.

When the H-PCF requests the V-PCF to identify subscriber information about route selection components required to generate the VPLMN URSP, the H-PCF may request the UDM so that the H-PCF may perform an identification procedure based on the subscriber information about the route selection component list received from the V-PCF.

In operation 509, the H-PCF transmits a UE policy control generation response to the V-PCF. The V-PCF receives a UE policy control generation response message from the H-PCF.

In CASE A, the H-PCF transmits the result of notifying the V-PCF that the UE policy control generation request has been successfully received to the V-PCF.

In CASE B, the H-PCF transmits whether to approve the VPLMN URSP generation permission request made by the V-PCF.

When the request for permission to generate the VPLMN URSP requested by the V-PCF is approved, the H-PCF allocates the VPLMN precedence range requested by the VPLMN and transfers a precedence or precedence range or precedence list to be included in the URSP rule usable in the allocated VPLMN.

Further, the H-PCF may identify subscriber information about route selection components for generating the VPMN URSP requested by the V-PCF, and transfer the identified component list to the V-PCF. Alternatively, the result that the route selection components for generating the requested VPMN URSP have been approved or, if only some component(s) are approved, only the list of the approved components or the list of non-approved components alone may be transmitted to the V-PCF as a result.

In operation 510, the V-PCF transmits a UE policy control generation response message to the AMF.

In operation 511, when the H-PCF corresponds to the HUG scenario, the H-PCF generates the URSP rule requested by the VPLMN through the information included in the request of the V-PCF and the subscriber information identified from the UDM (CASE A), otherwise (CASE B), the H-PCF generates the URSP of the HPLMN according to the existing method, and transfers the UpdateNotify request including the generated information to the V-PCF. And In operation 512, the H-PCF receives an UpdateNotify response from the V-PCF.

When the H-PCF generates the URSP rule in consideration of the request of the VPLMN, the H-PCF may generate the URSP for the approved route selection components. The URSP rule may be generated by considering at least one of the following information such as a) and b):

a) HUG information requested from the VPLMN received in operation 506; and
b) Route selection component information for URSP configuration approved to UDM for HUG information requested from VPLMN through operations 507 and 508.

In an embodiment of the disclosure, the URSP rule generated through the URSP generation request received from the VPLMN is configured not to conflict with the existing HPLMN URSP rule. The H-PCF may adjust the precedence of the URSP rule for the HPLMN or the URSP rule generated from the VPLMN request, or remove or change conflicting rules.

In operation 513, VPLMN URSP is generated in V-PCF. In order for the V-PCF to generate the VPLMN URSP, at least one of the following information 1) to 4) may be utilized.

1) Preprepared URSP rule: The V-PCF may obtain the pre-prepared URSP rule from the UDR of the VPLMN to generate the VPLMN URSP rule (not shown).
2) Information for generating the VPLMN URSP (LBO information): The V-PCF may generate the route selection component of the VPLMN URSP rule using the information for generating the VPLMN URSP (LBO information) received by the AMF from the UDM.
3) PSI list: The V-PCF may determine a PSI list to be newly transmitted to the UE and a list of URSP rules, from the PSI list in the UE policy container information received from the UE.
4) Precedence of VPLMN URSP rule: V-PCF may determine the precedence of VPLMN URSP rule.

To determine the precedence of the VPLMM URSP rule, the V-PCF may receive the precedence for the predefined URSP rule from the V-UDR and the VPMN precedence range or list information received from the H-PCF and map the precedence for the predefined URSP rule to the URSP precedence range received from the H-PCF to determine the precedence of the VPLMN URSP.

When conflicting rules are generated for the same application in the VPLMN and the HPLMN, the H-PCF of the HPLMN allocates a precedence range that the VPLMN URSP rule may have to the V-PCF, and allows the V-PCF to allocate the precedence of the VPLMN URSP rule within the precedence allocated by the H-PCF of the HPLMN, so that the HPLMN may generate the rule within the range allocated by the HPLMN H-PCF even if the VPLMN transmits the VPLMN URSP rule generated by itself to the UE.

For example, if the HPLMN URSP rule and the VPLMN URSP rule as shown in Table 3 below exist, if the HPLMN allocates, for example, a range of VPLMN rule priorities that may be allocated by the VPLMN to 5 to 6, the HPLMN rule having a relatively higher precedence than the VPLMN rule may be preferentially applied to App #1 in the VPLMN, and the VPLMN precedence rule having a relatively higher precedence than the HPLMN rule may be preferentially applied to abc.com. The scope may be adjusted.

TABLE 3

| PLMN | PSI | URSP Rule | Rule Precedence | Traffic Descriptor | Route Selection Descriptor |
|---|---|---|---|---|---|
| HPLMN ID (MCC = 450, MNC = 50) | 1 | URSP Rule #1 | 1 | App #1 | DNN #1, S-NSSAI #1 |
| | | URSP Rule #2 | 2 | App #2 | DNN #2, S-NSSAI #2 |
| | | URSP Rule #3 | 7 | IP1.1.1.* | DNN #2, S-NSSAI #3 |
| | 2 | URSP Rule #4 | 8 | abc.com | DNN #1, S-NSSAI #4 |
| | | RUSP Rule #5 | 9 | Match-all | DNN #4, S-NSSAI #4 |
| VPLMN ID (MCC = 310, MNC = 150) | 3 | URSP Rule #5 | 5 | App #1 | DNN #3, S-NSSAI #5 |
| | 4 | URSP Rule #6 | 6 | abc.com | DNN #3, S-NSSAI #5 |

When the UE is not currently connected in operation 514, the AMF performs a network trigger service request procedure.

In operation 515, the AMF transmits the UE Configuration Update message to the UE through the base station. The UE Configuration Update message may include the above-described V-URSP and H-URSP.

In operation 516, the UE transfers the result of the UE policy delivery to the AMF.

In operation 517, the AMF transfers the UE policy delivery result to the PCF.

In operations 518 and 519, the V-PCF transfers the UE policy delivery result to the H-PCF and receives a response message from the H-PCF.

Figure 6:
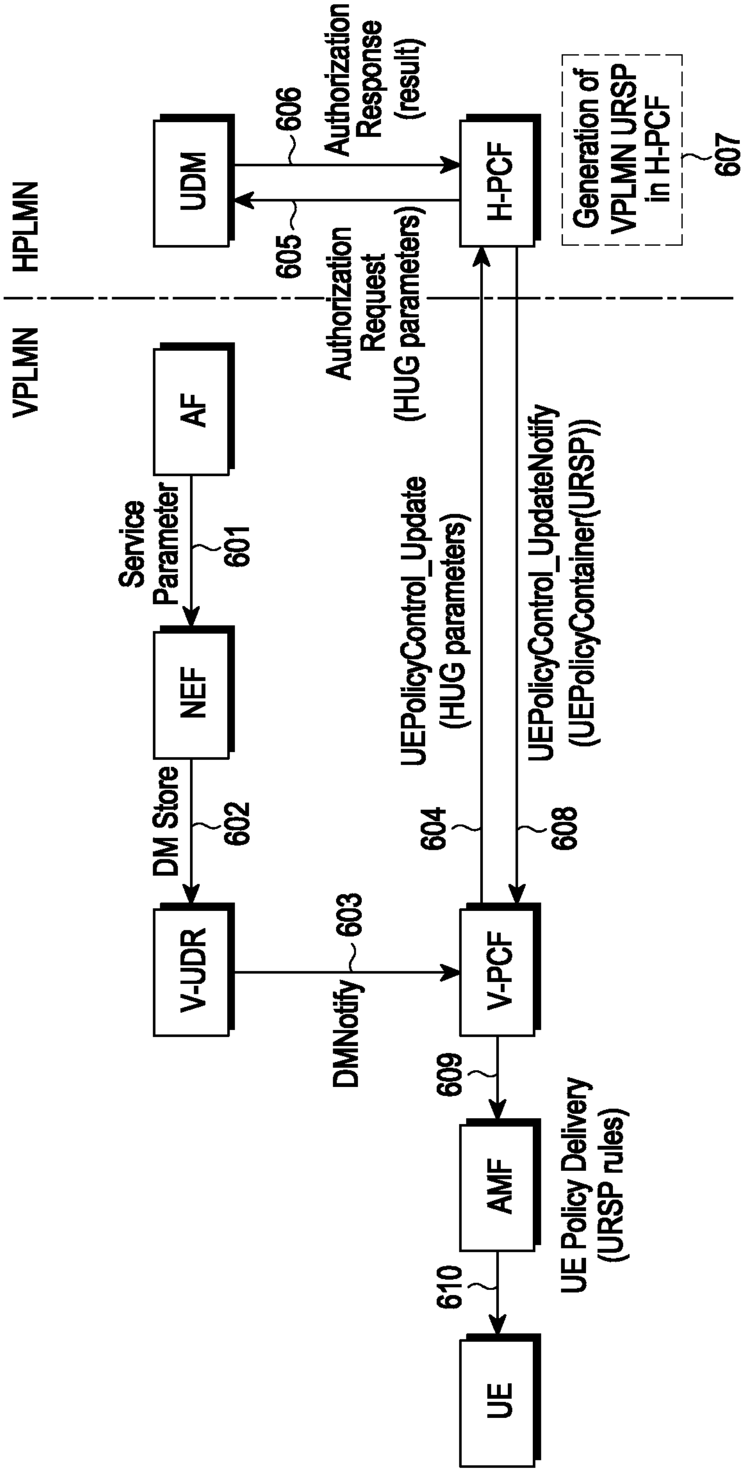
FIG. 6 illustrates an example scenario in which an H-PCF generates a URSP at a request of a V-PCF in a wireless communication system according to an embodiment of the present disclosure.
Figure 7:
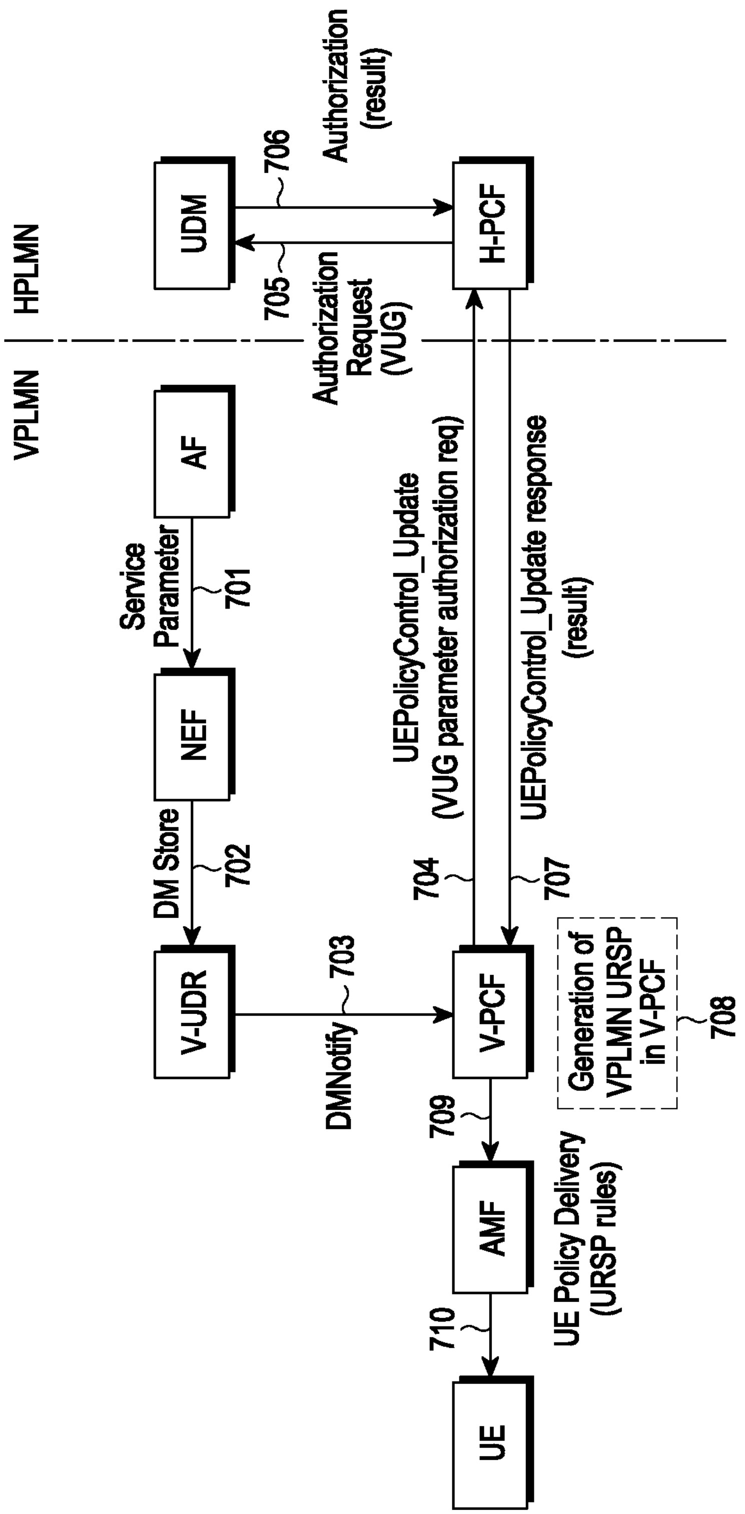
FIG. 7 illustrates an example scenario in which a V-PCF generates a VPLMN URSP in a wireless communication system according to an embodiment of the present disclosure.
Figure 8:
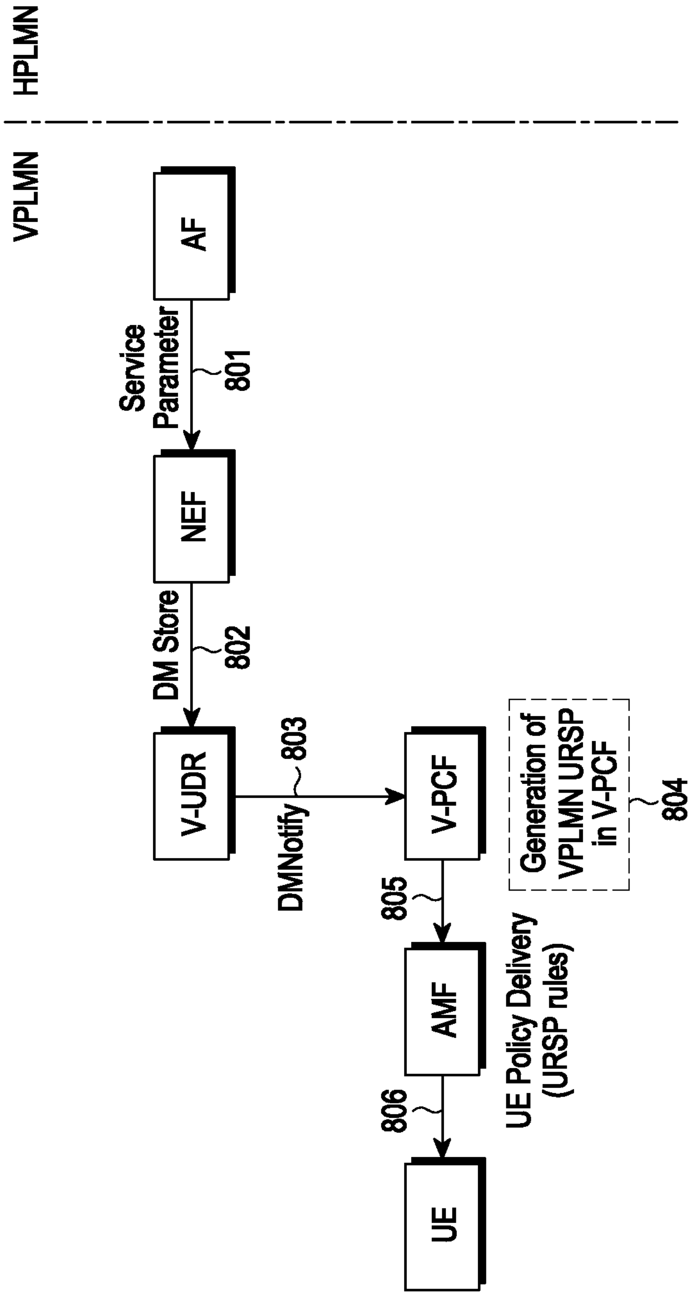
FIG. 8 illustrates an example scenario in which a V-PCF directly generates a VPLMN URSP when an H-PCF is not installed in a wireless communication system according to an embodiment of the present disclosure.

Hereinafter, three scenarios of providing an application guidance for determining a URSP in a VPLMN of the disclosure are described with reference to FIGS. 6 to 8, respectively. In the examples of FIGS. 6 to 8, basic functions of each network entity are the same as those in the description of FIG. 1, and thus a detailed description thereof will be omitted.

FIG. 6 illustrates an example scenario in which an H-PCF generates a URSP at a request of a V-PCF in a wireless communication system according to an embodiment of the present disclosure.

Referring to FIG. 6, in operation 601, the AF of the VPLMN transmits a request for provisioning the Service Parameter to the NEF for an application guidance request for determining the URSP among UE policies. The request for provisioning the Service Parameter includes information for generating a URSP among the UE policies.

In operation 602, since the NEF may not be directly connected to the UDM, the UDM subscription information of the HPLMN may not be identified. The NEF transmits a data management (DM) store message to the unified data repository (UDR) (V-UDR) of the VPLMN. The UDR may perform the functions of storing and providing subscriber information managed by the UDM, structured data for exposure, and application data related to NEF or service.

In operation 603, the V-UDR transfers the DM Notify to the V-PCF.

In operation 604, the V-PCF may perform the following operations after receiving the DM Notify.

The V-PCF identifies whether the UE is roaming.

The V-PCF identifies information related to VPLMN URSP generation among UDM information received by the UE during the registration procedure. The above-described LBO information may be corresponding information. Referring to the three cases described in connection with the embodiments of FIGS. 2, 3, and 4, the embodiment of FIG. 6 corresponds to the case of generating a VPLMN URSP in the H-PCF of the HPLMN. To this end, the V-PCF transfers parameters (HUG parameters) for generating the VPLMN URSP in the H-PCF In operation 604.

In operations 605 and 606, the H-PCF transmits/receives an authorization request/authorization response to/from the UDM of the HPLMN and receives confirmation through the UDM to determine whether information (e.g., information required to generate the route selection descriptor (RSD) of the URSP rule) included in the parameter (HUG parameter) for generating the URSP included in the request received from the V-PCF is information allowed in subscriber information.

When the information included in the parameters (HUG parameters) for generating the URSP in operation 607 is identified as allowable information in the subscriber information, the H-PCF generates the VPLMN URSP according to the request of the VPLMN in operation 604, and the H-PCF transfers the generated VPLMN URSP to the V-PCF in operation 608. In operations 609 and 610, the V-PCF transfers the VPLMN URSP generated by the H-PCF to the UE via the AMF through the UE policy delivery procedure. In this case, along with the VPLMN URSP, the HPLMN URSP generated in the H-PCF may also be transmitted.

FIG. 7 illustrates an example scenario in which a V-PCF generates a VPLMN URSP in a wireless communication system according to an embodiment of the present disclosure.

Referring to FIG. 7, operations 701 to 703 are the same as operations 601 to 603 of FIG. 6, and thus detailed descriptions thereof will be omitted.

In operation 704, the V-PCF may receive DM Notify from the V-UDR and perform the following operations.

The V-PCF identifies information related to VPLMN URSP generation among UDM information received by the UE from the AMF during the registration procedure. The above-described LBO information may be corresponding information. Referring to the three cases described in connection with the embodiments of FIGS. 2, 3, and 4, the embodiment of FIG. 7 corresponds to a case where the V-PCF of the VPLMN is allowed to generate the URSP.

In operation 704, the V-PCF identifies whether the connected UE is roaming. In operations 704 to 707, the V-PCF may perform, for example, as in the embodiment of FIG. 3, a procedure of identifying subscriber information about a route selection component used to generate the VPLMN URSP in the V-PCF through the H-PCF.

In operations 705 and 706, the H-PCF receives confirmation through the UDM to determine whether the information (information required to generate the RSD of the URSP rule) included in the parameter (VUG-related parameter) for generating the URSP included in the request received from the V-PCF in the UDM is information allowed in the subscriber information. In this case, the HPLMN URSP generated by the H-PCF may also be transferred.

When the information included in the parameter (VUG-related parameter) for generating the URSP in operation 707 is identified as information allowed in the subscriber information, the V-PCF generates the VPLMN URSP in operation 708. The V-PCF may generate the VPLMN URSP rule using the identified RSD parameters of the VPLMN URSP.

In operations 709 and 710, the V-PCF transfers the VPLMN URSP to the UE via the AMF through the UE policy delivery procedure. In this case, along with the VPLMN URSP, the HPLMN URSP generated in the H-PCF may also be transmitted.

FIG. 8 illustrates an example scenario in which a V-PCF directly generates a VPLMN URSP when an H-PCF is not installed in a wireless communication system according to an embodiment of the present disclosure.

Referring to FIG. 8, operations 801 to 803 are the same as operations 601 to 603 of FIG. 6, and thus detailed descriptions thereof will be omitted.

In operation 804, the V-PCF may receive DM Notify from the V-UDR and perform the following operations.

The V-PCF identifies information related to VPLMN URSP generation among UDM information received by the UE from the AMF during the registration procedure. The above-described LBO information may be corresponding information. Referring to the three cases described in connection with the embodiments of FIGS. 2, 3, and 4, the embodiment of FIG. 8 corresponds to the case in which the V-PCF of the VPLMN is allowed to generate the URSP, and the H-PCF is not installed in the HPLMN.

In operation 804, the V-PCF may identify whether the RSD parameter for the rule for generating the VPLMN URSP is an allowable value for the UE through the LBO information received from the UDM of the HPLMN through the AMF.

When the VPLMN is allowed to generate the URSP, the V-PCF generates the VPLMN URSP In operation 804.

In operations 805 and 806, the V-PCF transfers the generated VPLMN URSP rule to the UE via the AMF.

Figure 9:
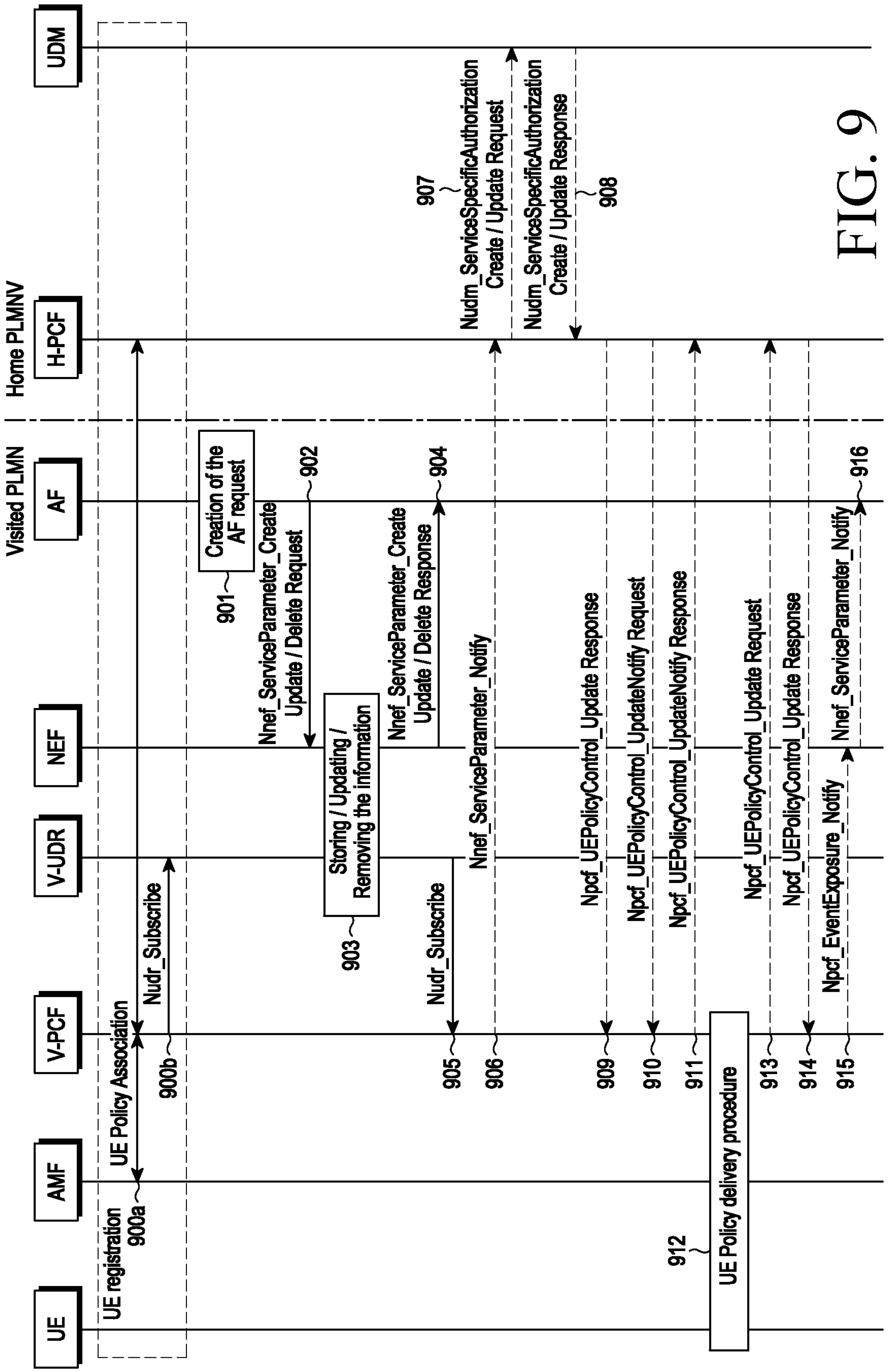
FIG. 9 illustrates a procedure for application guidance for determining a URSP in a VPLMN in a wireless communication system according to an embodiment of the present disclosure.

FIG. 9 illustrates a procedure for application guidance for determining a URSP in a VPLMN in a wireless communication system according to an embodiment of the present disclosure. In the example of FIG. 9, the basic functions of each network entity are the same as those in the description of FIG. 1, and thus a detailed description thereof will be omitted.

In operations 900*a* and 900*b* of FIG. 9, a registration procedure is performed in a roaming situation of a UE. In this case, the UE policy association may be performed between the AMF, the V-PCF, and the H-PCF.

In operation 901, the AF generates an application guidance request for determining the URSP among the UE policies.

In operation 902, the AF transfers a service parameter generation/update/deletion request message to NEF. In operation 903, the NEF may store/update/delete the AF request received from the AF in the V-UDR. In operation 904, the NEF may transmit a response message to the service parameter generation/update/deletion request to the AF.

In operation 905, the V-UDR transmits VPLMN URSP support information (parameter) for generating the VPLMN URSP in the H-PCF or V-PCF to the V-PCF. The VPLMN URSP support information (parameter) may include at least one of the precedence of the URSP rule, the URSP traffic descriptor, and information for configuring the RSD in the URSP as the parameter.

In operation 906, the V-PCF may be divided into three cases according to the information for generating the URSP in the VPLMN received by the AMF from the UDM in the UE registration procedure. Specifically, the V-PCF may identify and determine the contents (e.g., HUG or VUG) included in the VPLMN URSP support information received from the AMF whether to generate the VPLMN URSP by itself and transmit the VPLMN URSP to the UE or to request the H-PCF to generate the VPLMN URSP. Alternatively, in another embodiment, the V-PCF may determine whether to directly generate the VPLMN URSP or to request the H-PCF to generate the VPLMN URSP through its own configuration in the V-PCF or PCF control policy information stored in the V-UDR. When the PCF control policy information is set in the V-UDR, the V-PCF may perform a procedure (not shown) of obtaining the PCF control policy information from the V-UDR before. In operations 907 and 908, the H-PCF transmits an authorization request to the UDM to determine/identify whether the information included in the parameter for generating the URSP included in the request received from the V-PCF (information necessary for generating the RSD of the URSP rule) is information allowed in the subscriber information, and receives an authorization response from the UDM.

Specifically, in CASE A described above, the H-PCF may request the UDM as to whether to allow to use and identify whether the route selection components in the route selection descriptor of the URSP are values usable by the corresponding subscriber UE. In CASE B described above, the H-PCF may request the UDM to determine whether the VPLMN URSP requested by the V-PCF may generate the VPLMN URSP by itself. When the H-PCF requests the V-PCF to identify subscriber information about route selection elements required to generate the VPLMN URSP, the H-PCF may request the UDM so that the H-PCF may perform an identification procedure based on the subscriber information about the route selection element list received from the V-PCF.

In operation 909, the H-PCF transmits a UE policy update response message to the V-PCF. The V-PCF receives a UE policy control generation response message from the H-PCF.

In operation 909, in CASE A described above, the H-PCF may transmit the result of notifying the V-PCF that the UE policy control generation request has been successfully received to the V-PCF. In CASE B described above, the H-PCF transmits whether to approve the VPLMN URSP generation permission request made by the V-PCF. When the request for permission to generate the VPLMN URSP requested by the V-PCF is approved, the H-PCF allocates the VPLMN precedence range requested by the VPLMN and may transfer a precedence or precedence range or precedence list to be included in the URSP rule usable in the allocated VPLMN. Further, the H-PCF may identify subscriber information about route selection components for generating the VPMN URSP requested by the V-PCF, and transfer the identified component list to the V-PCF. Alternatively, the result that the route selection components for generating the requested VPMN URSP have been approved or, if only some component(s) are approved, only the list of the approved components or the list of non-approved components alone may be transmitted to the V-PCF as a result.

In operation 910, the H-PCF generates the URSP rule according to the VPLMN request and transfers the UE policy control update notification request to the V-PCF. In operation 910, in CASE A described above, the VPLMN URSP and the HPLMN URSP generated in the H-PCF may be transferred to the V-PCF. In CASE B described above, the HPLMN URSP generated in the H-PCF may be transferred to the V-PCF.

In operation 911, the V-PCF transfers a UE policy control update notification response to the H-PCF in response to the reception in operation 910. Meanwhile, in CASE B described above, VPLMN URSP is generated in the V-PCF.

In operation 912, the V-PCF performs a UE policy delivery procedure to the UE through the AMF. In this case, the VPLMN URSP and the HPLMN URSP may be transferred to the UE, or the VPLMN URSP may be transmitted.

In operations 913 and 914, when the V-PCF receives the UE policy delivery result from the UE, the V-PCF transfers this information to the H-PCF and receives a response from the H-PCF.

In operation 915, the V-PCF transfers the UE policy delivery result to the NEF.

In operation 916, the NEF transmits a UE policy delivery result notification to the AF.

According to the above-described embodiments of the disclosure, while the UE is roaming, the VPLMN may transfer the policy of the UE to the UE through the AMF in the V-PCF, and the VPLMN may transfer the dynamically changed URSP rule of the VPLMN to the UE. Further, when the HPLMN subscriber information is changed, the VPLMN URSP rule may be generated or requested for generation by identifying the subscriber information in the VPLMN without additional procedures, and the precedence of the URSP may be selectively allocated to the VPLMN in the HPLMN.

Figure 10:
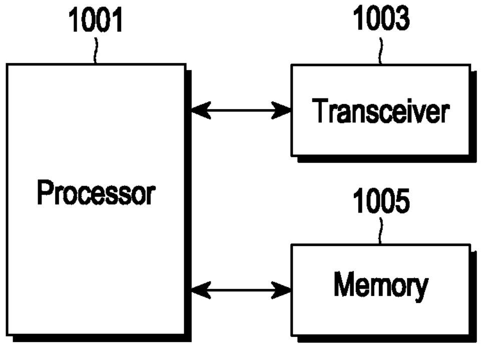
FIG. 10 illustrates a configuration of a network entity in a wireless communication system according to an embodiment of the present disclosure.

FIG. 10 illustrates a configuration of a network entity in a wireless communication system according to an embodiment of the present disclosure. The network entity of FIG. 10 may be one of network entities, such as AMF, PCF (V-PCF, H-PCF), UDM, UDR (V-UDR), and NEF described in the embodiments of FIGS. 1 to 9.

As shown in FIG. 10, the network entity may include a processor 1001, a transceiver 1003, and a memory 1005. The processor 1001, transceiver 1003, and memory 1005 of the network entity may be operated according to the communication methods of the network entity described above in connection with the embodiments of FIGS. 1 to 9. However, the components of the network entity are not limited thereto.

For example, the network entity may include more or fewer components than the above-described components. The processor 1001, the transceiver 1003, and the memory 1005 may be implemented in the form of a single chip.

The transceiver 1003 collectively refers to the receiver of the network entity and the transmitter of the network entity and may transmit and receive signals to/from a UE or another network entity. The transmitted/received signals may include at least one of control information and data. To that end, the transceiver 1003 may include an RF transmitter for frequency-up converting and amplifying signals transmitted and an RF receiver for low-noise amplifying signals received and frequency-down converting the frequency of the received signals. This is merely an embodiment of the transceiver 1003, and the components of the transceiver 1003 are not limited to the RF transmitter and the RF receiver. The transceiver 1003 may include a wired/wireless transmission/reception unit and may include various components for transmitting/receiving signals. The transceiver 1003 may receive signals through a predetermined communication interface, output the signals to the processor 1001, and transmit the signals output from the processor 1001.

Further, the transceiver 1003 may receive the communication signal and output the signal to the processor 1001 and transmit the signal output from the processor 1001 to the UE or another network entity through the network. The memory 1005 may store programs and data necessary for the operation of the network entity according to at least one of the embodiments of FIGS. 1 to 9. Further, the memory 1005 may store control information or data that is included in the signal obtained by the network entity. The memory 1005 may include a storage medium, such as ROM, RAM, hard disk, CD-ROM, and DVD, or a combination of storage media.

The processor 1001 may control a series of processes so that the network entity may operate according to at least one of the embodiments of FIGS. 1 to 9. The processor 1001 may include at least one processor. The methods according to the embodiments descried in the specification or claims of the disclosure may be implemented in hardware, software, or a combination of hardware and software. When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or the programs may be stored in a memory constituted of a combination of all or some thereof. As each constituting memory, multiple ones may be included. The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an" and "the" are intended to include the plural forms as well, unless the context clearly indicates otherwise.

Meanwhile, although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed:

1. A method of an access and mobility management function (AMF) of a visited public land mobile network (VPLMN) in a wireless communication system supporting a roaming operation, the method comprising:

receiving, from a user equipment (UE), a registration request including a policy section identifier (PSI);

identifying a home public land mobile network (HPLMN) of the UE based on the PSI;

transmitting a message for requesting subscription information of the UE to a user data management (UDM) in the HPLMN of the UE;

receiving, from the UDM in the HPLMN of the UE, the subscription information of the UE, wherein the subscription information comprises local breakout (LBO) information on session related subscription information;

receiving, from the UDM of the HPLMN, information for generating a UE route selection policy (URSP); and transmitting, to a first policy control function (PCF) of the VPLMN, a request for generating the URSP, based on the subscription information, wherein the LBO information comprises at least one of a data network name (DNN) or single-network slice selection assistance information (S-NSSAI) available in the VPLMN.

2. The method of claim 1, wherein the request further includes information for generating a VPLMN URSP in a second PCF of the HPLMN.

3. The method of claim 2, wherein the information for generating the VPLMN URSP further includes parameters for generating the VPLMN URSP in the second PCF of the HPLMN.

4. The method of claim 1, further comprising:

receiving, from the first PCF, a delivery message including a VPLMN URSP; and transmitting, to the UE, a UE configuration update message including the VPLMN URSP.

5. The method of claim 4, wherein the LBO information further includes an indicator indicating generation of the VPLMN URSP in the HPLMN.

6. The method of claim 1, wherein a VPLMN URSP is obtained based on precedence information of a URSP rule usable in the VPLMN.

7. The method of claim 1, wherein the PSI includes a value for distinguishing a PLMN.

8. The method of claim 1, wherein the information for generating the URSP comprises at least one of an indicator allowing a VPLMN URSP to be generated and/or transmitted in the VPLMN or subscriber information for the VPLMN URSP.

9. The method of claim 1, wherein the at least one of the DNN or the S-NSSAI included in the LBO information corresponds to at least one value for local breakout, which is used upon generating a PDU session locally in the VPLMN.

10. An access and mobility management function (AMF) of a visited public land mobile network (VPLMN) in a wireless communication system supporting a roaming operation, the AMF comprising:

a transceiver; and a processor operably coupled to the transceiver, the processor configured to:

receive, from a user equipment (UE), a registration request including a policy section identifier (PSI), through the transceiver, identify a home public land mobile network (HPLMN) of the UE based on the PSI, transmit a message for requesting subscription information of the UE to a user data management (UDM) in the HPLMN of the UE, through the transceiver, receive, from the UDM in the HPLMN of the UE, the subscription information of the UE, wherein the subscription information comprises local breakout (LBO) information on session related subscription information, through the transceiver, receive, from the UDM of the HPLMN, information for generating a UE route selection policy (URSP), through the transceiver, and transmit, to a first policy control function (PCF) of the VPLMN, a request for generating the URSP, based on the subscription information, through the transceiver, wherein the LBO information comprises at least one of a data network name (DNN) or single-network slice selection assistance information (S-NSSAI) available in the VPLMN.

11. The AMF of claim 10, wherein the request further includes information for generating a VPLMN URSP in a second PCF of the HPLMN.

12. The AMF of claim 11, wherein the information for generating the VPLMN URSP further includes parameters for generating the VPLMN URSP in the second PCF of the HPLMN.

13. The AMF of claim 11, wherein the LBO information further includes an indicator indicating generation of the VPLMN URSP in the HPLMN.

14. The AMF of claim 10, wherein the processor is further configured to:

receive, from the first PCF, a delivery message including a VPLMN URSP; and transmit, to the UE, a UE configuration update message including the VPLMN URSP through the transceiver.

15. The AMF of claim 10, wherein a VPLMN URSP is obtained based on precedence information of a URSP rule usable in the VPLMN.

16. The AMF of claim 10, wherein the PSI includes a value for distinguishing a PLMN.

17. The AMF of claim 10, wherein the information for generating the URSP comprises at least one of an indicator allowing a VPLMN URSP to be generated and/or transmitted in the VPLMN or subscriber information for the VPLMN URSP.

18. The AMF of claim 10, wherein the at least one of the DNN or the S-NSSAI included in the LBO information corresponds to at least one value for local breakout, which is used upon generating a PDU session locally in the VPLMN.

* * * * *